United States Patent [19]
Stephenson

[11] Patent Number: 5,912,716
[45] Date of Patent: Jun. 15, 1999

[54] SELECTIVELY PRESENTING VIEWABLE AND CONDUCTIVE IMAGES

[75] Inventor: Stanley W. Stephenson, Spencerport, N.Y.

[73] Assignee: Eastman Kodak Company, Rochester, N.Y.

[21] Appl. No.: 09/027,321

[22] Filed: Feb. 20, 1998

[51] Int. Cl.$^6$ .................................................. G02F 1/1335
[52] U.S. Cl. ......................... 349/106; 349/142; 349/139; 349/2
[58] Field of Search .............................. 349/2, 139, 142, 349/106; 345/7, 41, 43; 430/20; 6/217; 40/361, 427, 428

[56] References Cited

U.S. PATENT DOCUMENTS

| | | | |
|---|---|---|---|
| 4,435,047 | 3/1984 | Fergason . | |
| 5,351,143 | 9/1994 | Sato et al. | 349/142 |
| 5,462,822 | 10/1995 | Roosen et al. . | |
| 5,527,650 | 6/1996 | Yoshinaga et al. | 349/113 |
| 5,754,268 | 5/1998 | Aihara et al. | 349/142 |

OTHER PUBLICATIONS

O'Mara, Liquid Crystal Flat Panel Displays, Chapman & Hall, New York, NY, 1993.

*Primary Examiner*—William L. Sikes
*Assistant Examiner*—Kenneth Parker
*Attorney, Agent, or Firm*—Raymond L. Owens

[57] ABSTRACT

A display for presenting selected images to a viewer including a substrate; a photosensitive layer provided over the substrate which is adapted to be exposed and developed to provide viewable and conductive images; and a light modulating layer formed over the photosensitive layer and effective in two conditions, in a first condition to prevent the viewing of the viewable and conductive images and in a second condition to permit viewing of the viewable and conductive images. The display includes an electrical conductive structure connected to the viewable and conductive images for applying a field to selected ones of such viewable and conductive images to cause the light modulating layer overlying the selected ones of the viewable and conductive images to change from the first condition to the second condition so as to present such viewable and conductive images for viewing to the viewer.

10 Claims, 4 Drawing Sheets

SELECTIVELY PRESENTING VIEWABLE AND CONDUCTIVE IMAGES

CROSS REFERENCE TO RELATED APPLICATIONS

Reference is made to commonly assigned U.S. Patent application Ser. No. 08/961,059 filed Oct. 30, 1997, entitled "Display Apparatus Using Light Patternable Conductive Traces" by Stanley W. Stephenson; U.S. Patent application Ser. No. 08/961,056 filed Oct. 30, 1997, entitled "Single Sheet Display Having Patternable Conductive Traces" by Stanley W. Stephenson; U.S. Patent application Ser. No. 08/990,891 filed Dec. 15, 1997, entitled "Method of Producing a Display Having Patternable Conductive Traces" by Stanley W. Stephenson and U.S. Patent application Ser. No. 08/990,853 filed Dec. 15, 1997, entitled "A Sheet Having Patternable Conductive Traces for Use in a Display" by Stanley W. Stephenson, the disclosures of which are incorporated herein by reference.

FIELD OF THE INVENTION

The present invention relates to displays in which preformed images can be selectively presented to a viewer.

BACKGROUND OF THE INVENTION

Flat panel displays can be fabricated using many techniques. Typical embodiments are disclosed in *Liquid Crystal Flat Panel Displays* by William C. O'Mara (Chapman & Hall, New York, N.Y. 1993) and other similar publications. These displays use transparent glass plates as substrates, and electrical traces are sputtered in a pattern of parallel lines that form a first set of conductive traces. A transparent conductor such as Indium Tin Oxide is sputtered over the traces to disperse an electrical charge across transparent areas not blocked by the traces. A second substrate is similarly coated with a set of traces having a transparent conductive layer.

Layers are applied over the substrates and patterned to orient liquid crystals in twisted nematic (TN) or super-twisted-nematic (STN) configurations. The two substrates are spaced apart and the space between the two substrates is filled with a liquid crystal material. Pairs of conductors from either set are selected and energized to alter the optical transmission properties of the liquid crystal material.

In another embodiment, the traces do not define an orthogonal grid, but are organized to form alpha-numeric displays or graphic images. In a further embodiment, an active display on a transparent substrate is sputtered or printed and uses memory elements to continuously drive a each display element depending on information written to the memory element. In another embodiment, disclosed in SID DIGEST 90, article 12.6, the liquid crystal material can be polymerically dispersed to form a Liquid Crystal Polymer Matrix (LCPC). LCPCs are typically disposed in ultra-violet polymerized acrylic polymers. The liquid crystals are homogenized into the polymer, and the emulsion is coated onto a substrate. Ultra violet light is applied to the emulsion. The emulsion hardens, and bubbles of liquid crystal material are held in a rigid polymeric matrix.

Reflective liquid crystal polymer matrix displays are disclosed in U.S. Pat. No. 4,435,047. A first sheet has transparent Indium-Tin-Oxide (ITO) conductive areas and a second sheet has electrically conductive inks printed on display areas. The sheets can be glass, but in practice have been formed of Mylar polyester. A dispersion of liquid crystal material in a binder is coated on the first sheet, and the second sheet is pressed onto the liquid crystal material. Electrical charges applied to opposing conductive areas operate on the liquid crystal material to expose display areas. Pleichroic dyes are added to the liquid crystal to cause the liquid crystal material to act as a shutter over the printed areas. The technology from this and related patents was licensed to the Taliq Corporation of Sunnyvale Calif. Currently, Taliq products form electrical interconnection by offsetting the two sheets and contacting trace conductors from each of the two sheets.

Image displays can provide color images if a color filter array is formed over the pixels of the display. In U.S. Pat. No. 5,462,822, three color layers are formed on a transparent substrate. In this patent, a transparent electrode layer is formed over the color filter. The filter plate is aligned onto a liquid crystal layer. The plate is glass and has silver halide, color-forming layers. A transparent electrode material is sputtered at high temperature over the CFA. In practice, the presence of the transparent electrode material causes ionic migration of the dyes in the dye layers. It would be advantageous to separate the electrically conductive layer from the dye layers.

The prior art requires multiple, separate layers on multiple plates to build up the display. The electrical traces and transparent conductive layers are typically formed through repeated vacuum deposition of materials on the substrate. These processes are expensive and require long processing times on capital intensive equipment. Because most display structures are formed of glass, two sheets are used and are offset to permit connection to two separate and exposed sets of traces that are disposed on separate sheets. It would advantageous to lower the cost of flat panel displays. Additionally, current structures are not amenable to the creation of low-cost large flat panel displays. It would be advantageous to be able to form low-cost, large flat-panel displays.

In many applications it is desirable to have a number of preformed images which can be selectively presented to a viewer on a display. These displays often include a liquid crystal material and an arrangement of conductors which can be ITO traces on a glass support. The ITO must be vacuum sputtered onto the glass support using a high temperature process. There is a series of complex manufacturing steps which must be used in the process of making these displays.

SUMMARY OF THE INVENTION

It is an object of the present invention to provide a display which permit the selected viewing of preformed images and which minimizes the problems found in the prior art.

This object is achieved in a display for presenting selected images to a viewer comprising:

a substrate;

a photosensitive layer provided over the substrate which is adapted to be exposed and developed to provide viewable and conductive images;

a light modulating layer formed over the photosensitive layer and effective in two conditions, in a first condition to prevent the viewing of the viewable and conductive images and in a second condition to permit viewing of the viewable and conductive images; and electrical conduction means connected to the viewable and conductive images for applying a field to selected ones of such viewable and conductive images to cause the light modulating layer overlying the selected ones of the viewable and conductive images to change from the first condition to the second condition so as to present such viewable and conductive images for viewing to the viewer.

Displays in accordance with the present invention have the advantage of providing a reflective display using light sensitive, conductor forming coatings under a liquid crystal, light modulating layer. The liquid crystal material and light sensitive conductor forming material is inexpensive when coated simultaneously using current photographic coating technology. Displays in accordance with the invention can be formed using inexpensive, fast photographic processes to expose and develop viewable and conductive images. The present invention can make use of high volume manufacturing techniques by using coating techniques.

DETAILED DESCRIPTION OF THE INVENTION

Figure 1:
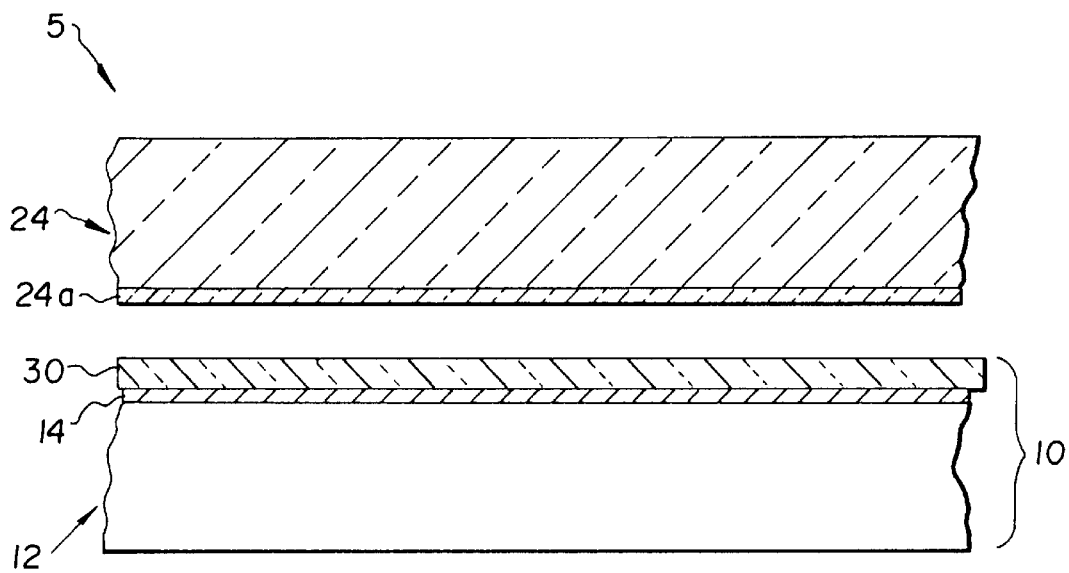
FIG. 1 is a sectional view of portions of the unassembled display in accordance with the present invention.

A sectional view of the invention is shown in FIG. 1. An unassembled display 5 includes a sheet 10 which has a substrate 12. The substrate 12 can be made of a polymeric material such as Kodak Estar film base formed of polyester plastic and with a thickness of between 20 and 200 microns. For a specific example, substrate 12 can be a 80 micron thick sheet of polyester film base. Other polymers, such as polycarbonate can also be used. Substrate 12 can be dyed to form a gray or black background. A photosensitive layer 14 is formed on the substrate 12.

In a preferred arrangement, the photosensitive layer 14 can be an emulsion of silver halide grains in gelatin. Alternatively, other light sensitive, metal forming materials can be used such as gold or copper salts. In the case of silver halide emulsions, high concentrations of silver halide salts in a binder such as gelatin or polyvinyl alcohol (PVA) are used to improve conductivity over conventional imaging emulsions. Conductive additives such as fine Indium-Tin-Oxide or fine silver with particle sizes between 0.5 and 2 microns can be added to the emulsion to improve conductivity of photographically produced metallic silver. The photosensitive layer 14 must be exposed and developed to provide viewable and conductive images. When silver halide grains in gelatin are used the conductive images are formed of silver.

Over the first photosensitive layer 14 is coated a light modulating layer 30. Light modulating layer 30 can be a liquid crystal of conventional design. Such material should exhibit high optical and electrical anisotropy and match the index of refraction of the carrier polymer, in this case gelatin, when the material is electrically oriented. Examples of such materials are Merck MLC-6406, MLC-6422, MLC6436-000, 6436-100, 9300-100. The liquid crystal material is dispersed in a polymeric binder such as gelatin or polyvinyl alcohol (PVA). It is advantageous that the binder have a low ionic content. The presence of ions in such a binder hinders the development of and electrical field across the dispersed liquid crystal material. Additionally, ions in the binder can migrate in the presence of an electrical field, chemically damaging the light modulating layer 30. Light modulating layer 30 must be formed of materials that permit penetration by an electrical conductor. The liquid crystal and gelatin emulsion is coated to a thickness of between 1 and 30 microns to optimize light modulating of light modulating layer 30. Pleichroic dyes can be added to the liquid crystal material to create a colored, or neutral light modulating layer 30. Other light-modulating, electrically operated materials can also be coated such as a micro-encapsulated ferroelectric (FLC) material. The light modulating layer 30 is effective in two conditions. In the first condition, the light modulating layer 30 prevents viewing the viewable and conductive silver images and in the second condition permits viewing of the viewable and conductive silver images as will become clearer hereinafter.

A transparent substrate shown as cover glass 24 is bonded over sheet 10. Cover glass 24 can be made of glass or a transparent polymeric film such as Mylar polyester. Cover glass 24 has a transparent electrically conductive layer 24a, which is an optically transparent, electrically conductive coating formed of Indium-Tin-Oxide (ITO). A typical sheet resistance of transparent electrically conductive layer 24a can be less than 250 ohms per square.

Figure 2:
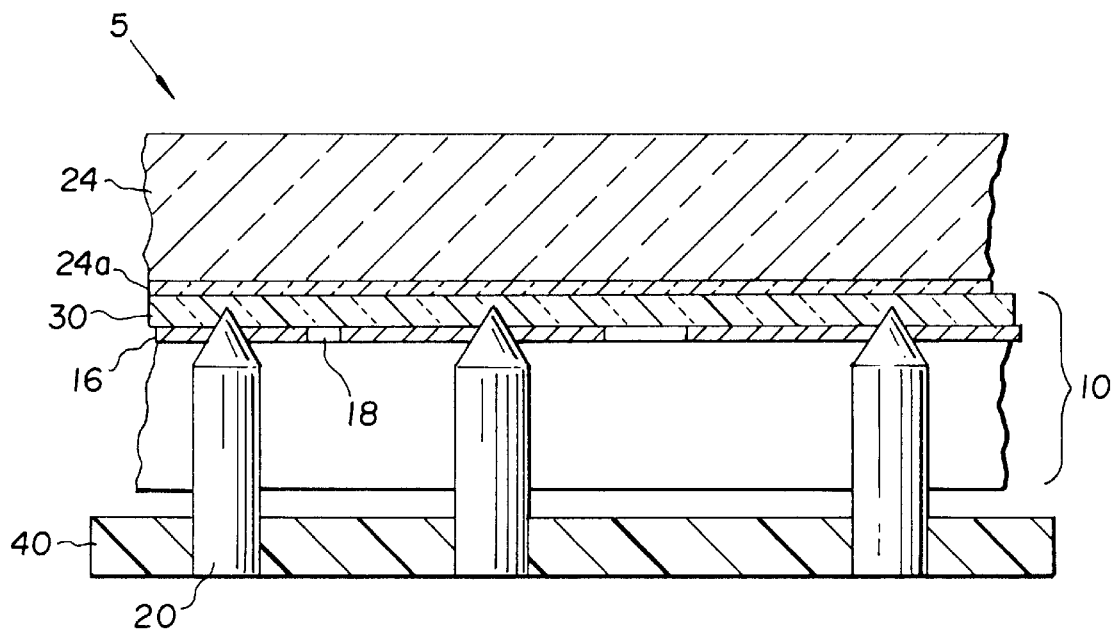
FIG. 2 is a sectional view of portions of the assembled display in accordance with the present invention.

FIG. 2 is a sectional view of an assembled display 5. Photosensitive layer 14 has been exposed and processed to create viewable and conductive images 16 and non-conductive areas 18. Viewable and conductive images 16 are metallic silver formed from exposed silver halide grains in the sheet 10. The effective sheet conductivity of viewable and conductive images 16 is less than 250 ohms per square. Viewable and conductive images 16 appear black, having an optical density of greater than 2.0 D. Unexposed silver halide in non-conductive areas 18 has been removed by conventional photographic processes to define the extent of viewable and conductive images 16. Alternatively, non-conductive area 18 can be small gaps in developed silver that electrically isolates electrically viewable and conductive images 16.

In FIG. 2, cover glass 24 has been bonded onto sheet 10. Transparent electrically conductive layer 24a provides a continuous electrode across cover glass 24. Transparent electrically conductive layer 24a works in conjunction with viewable and conductive images 16 to impose an electrical field across selected portions of light modulating layer 30. Piercing pins 20 are supported by circuit board 40, shown in FIG. 2 and 3a. Separate piercing pins 20 are pressed through substrate 12 and into each viewable and conductive image 16 to provide selectively imposed electrical fields between viewable and conductive images 16 and transparent electrically conductive layer 24a.

Figure 3A:
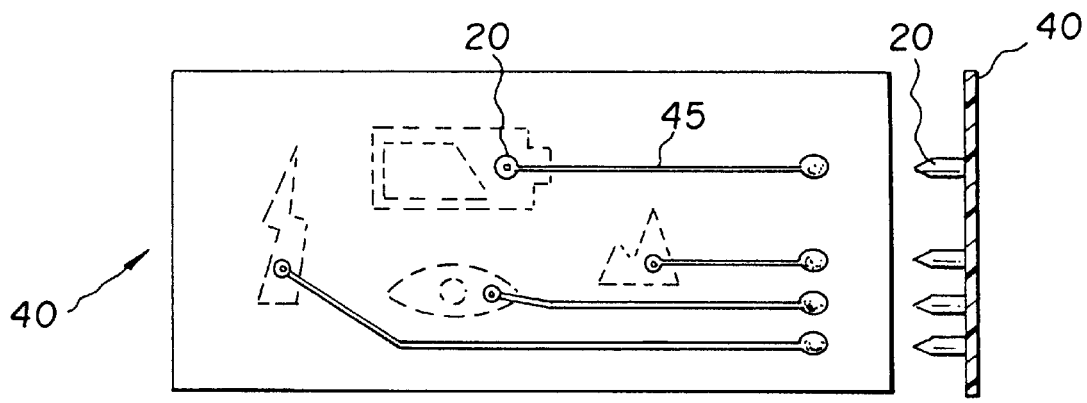
FIG. 3a is a top view of a circuit board included in the display of FIG. 2.
Figure 3B:
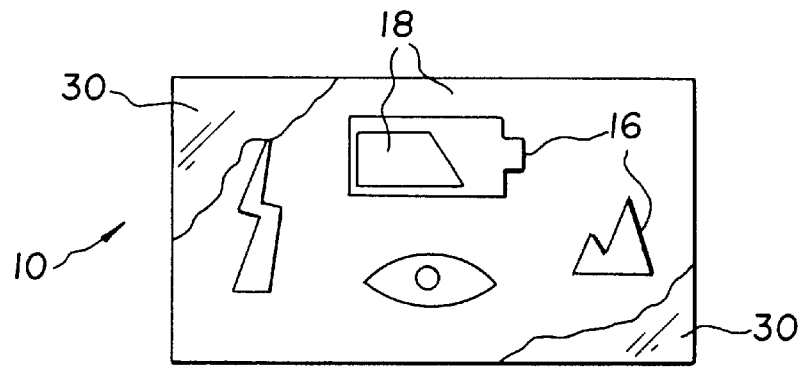
FIG. 3b is a broken away top view of layers of the display panel of FIG. 2 showing various viewable and conductive images.
Figure 3C:
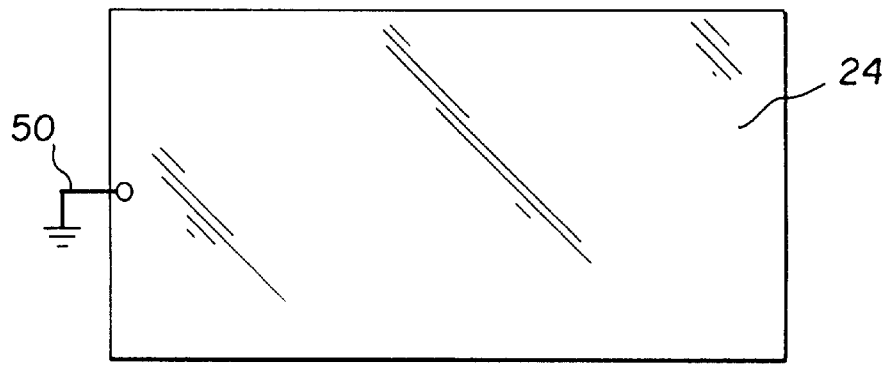
FIG. 3c is a top view of the second transparent substrate of the display of FIG. 2.

FIGS. 3a, 3b and 3c show views of each of the three parts of display 5. In FIG. 3a is circuit board 40, which has circuit board traces 45 running from a position under each viewable and conductive images 16 to a connection point. Piercing pins 20 are located under each viewable and conductive images 16 and are soldered to each circuit board trace 45 to provide electrical interconnect to each viewable and conductive images 16 on sheet 10.

FIG. 3b is a top view of sheet 10 with light modulating layer 30 sectioned away to show viewable and conductive images 16.

FIG. 3c is a top view of cover glass 24. Cover glass 24 will appear to be transparent. Cover glass 24 has ground connection 50 soldered to an edge outside of the display area.

Figure 4A:
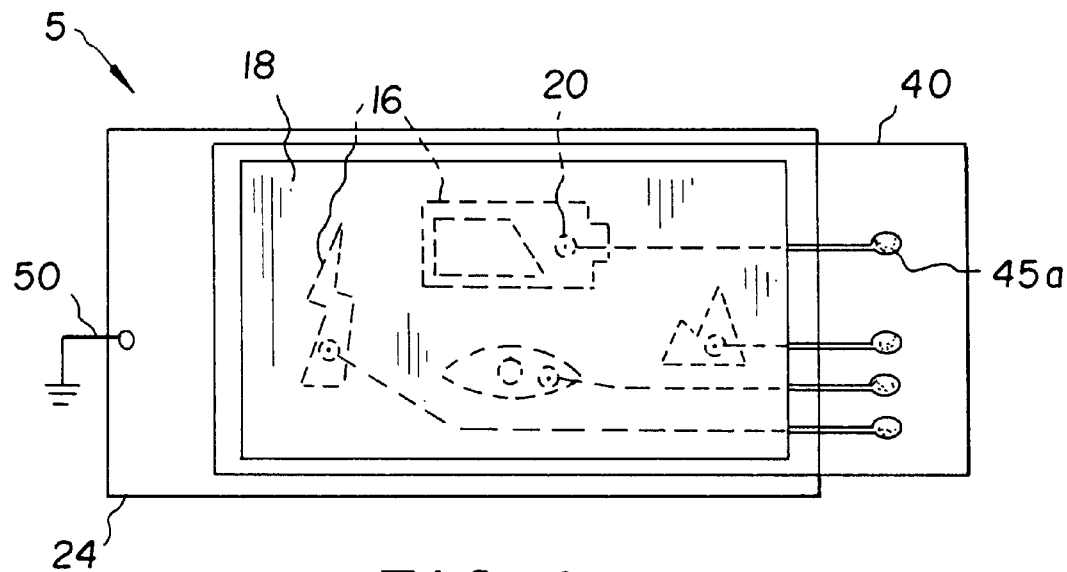
FIG. 4a is a top view of the assembled display in its first condition which prevents the display of viewable images the images being shown in a phantom format.
Figure 4B:
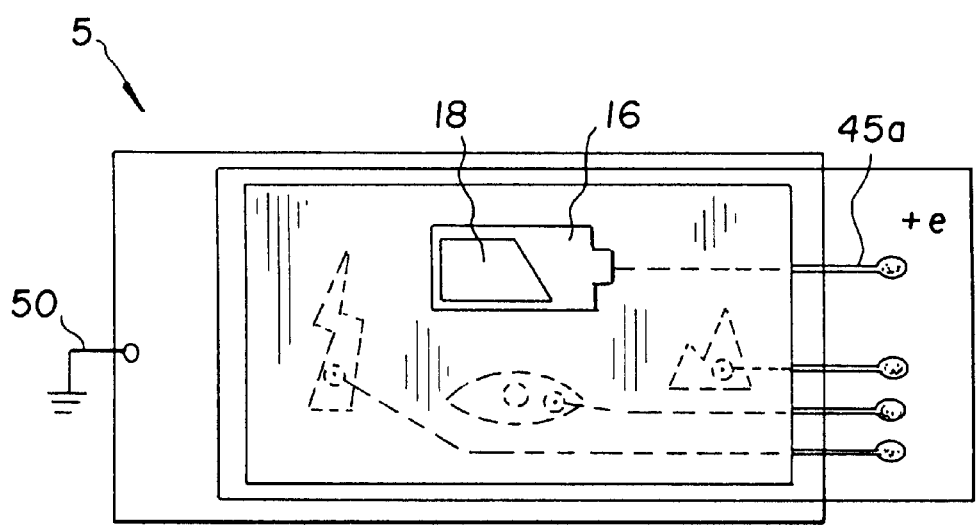
FIG. 4b is a top view of the assembled display of FIG. 4a it is second condition displaying one viewable image.

Top views of display 5 are shown in FIGS. 4a and 4b. Circuit board 40 has a series of the circuit board traces 45 that provide interconnection to external drive electronics. Each circuit board trace 45 terminates under a separate viewable and conductive image 16. Piercing pins 20 press through sheet 10 into viewable and conductive images 16.

In FIG. 4a, which shows a de-energized state or condition, viewable and conductive images 16 are obscured by light modulating layer 30 which covers viewable and conductive images 16. Cover glass 24 is bonded over sheet 10 and ground connection 50 has been soldered onto the transparent electrically conductive layer 24a.

FIG. 4b shows the activation of one area of display 5. One of the circuit board traces 45 (see circuit board trace 45a) is shown to be electrically connected to a source of potential, +e. It will be understood by those skilled in the art that a control circuit should actually be interposed between the potential source e+ and the conductive traces 45 to selectively apply potential to viewable and conductive images 16 which are to be displayed. Similarly, the other circuit board traces 45 are connected to appropriate electrical potentials. Circuit board trace 45 carries the charge to piercing pins 20 and into viewable and conductive images 16. The other electrical connection for a viewable and conductive image 16 is shown as ground connection 50. The potential is selectively applied across appropriate circuit board traces to a viewable and conductive image 16. A field is produced which causes liquid crystal material in light modulating layer 30 to align with the imposed electrical field. Areas of light modulating layer 30 overlying selected viewable and conductive images 16 becomes transparent and viewable and conductive images 16 are exposed.

FIGS. 5a–e are schematic representations of how viewable and conductive images 16 are formed in photosensitive layer 14. Unexposed silver halide 92 is the light sensitive material.

Figure 5A:
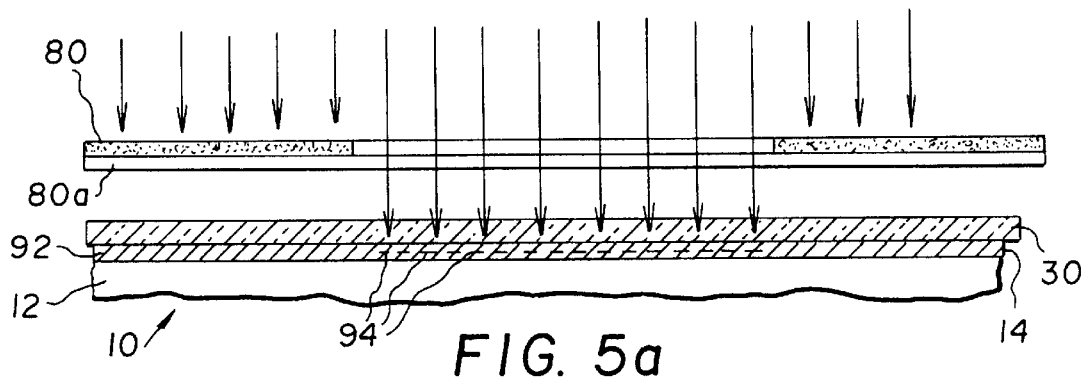
FIGS. 5a–5e show steps in the formation of the viewable and conductive images usable in the display of FIG. 2.

In FIG. 5a, photo mask 80 selectively blocks a source of light that strikes and exposes silver halide 94 while unexposed silver halide 92 remains inactivated. A photo mask conductive coating 80a works in conjunction with a grounding plate on the other side of sheet 10 to drive light modulating layer 30 to a transparent condition or state. The photo mask conductive coating 80a can be a sputtered coating of indium-tin-oxide (ITO) or tin-oxide having optical transparency greater than 85% and electrical conductivity greater than 250 ohms per square.

Figure 5B:
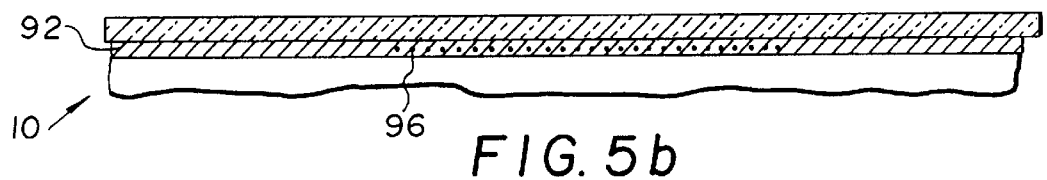

In FIG. 5b sheet 10 is photographically developed to convert exposed silver halide 94 to metallic silver 96. Metallic silver 96 forms viewable and conductive images 16 in sheet 10.

Figure 5C:
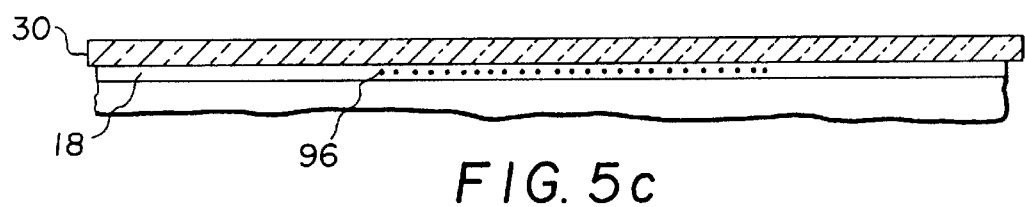

In FIG. 5c, a conventional photographic fixing step has removed the unexposed silver halide 92. Removal of unexposed silver halide 92 leaves non-conductive areas 18 in sheet 10.

Figure 5D:
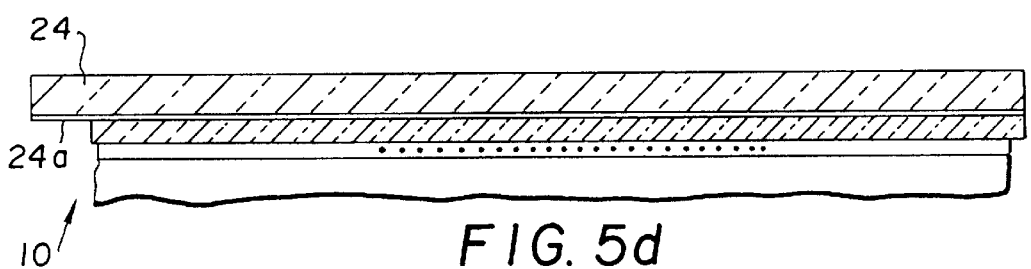

In FIG. 5d, cover glass 24 has been adhesively bonded to sheet 10.

Figure 5E:
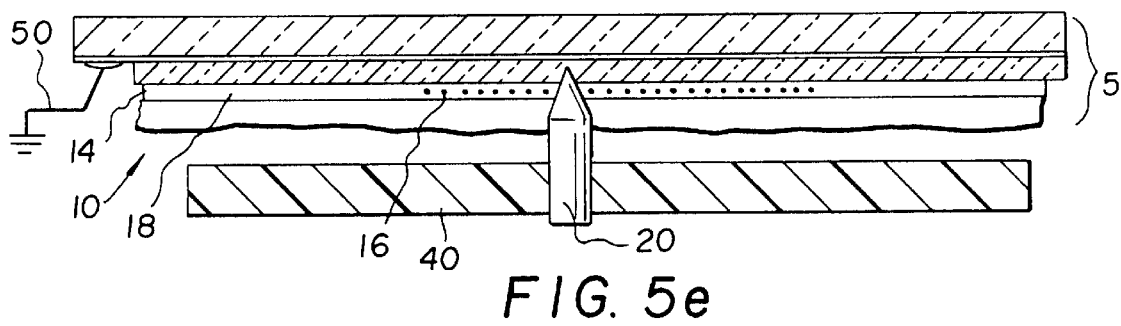

In FIG. 5e, piercing pins 20 on circuit board 40 have been driven through sheet 10 and into photosensitive layer 14 to electrically connect with viewable and conductive images 16 in photosensitive layer 14.

The invention has been described in detail with particular reference to certain preferred embodiments thereof, but it will be understood that variations and modifications can be effected within the spirit and scope of the invention.

| PARTS LIST | |
|---|---|
| 5 | display |
| 10 | sheet |
| 12 | substrate |
| 14 | photosensitive layer |
| 16 | viewable and conductive images |
| 18 | non-conductive areas |
| 20 | piercing pins |
| 24 | cover glass |
| 24a | transparent electrically conductive layer |
| 30 | light modulating layer |
| 40 | circuit board |
| 45 | circuit board traces |
| 45a | circuit board trace |
| 50 | ground connection |
| 80 | photo mask |
| 80a | photo mask conductive coating |
| 92 | unexposed silver halide |
| 94 | exposed silver halide |
| 96 | metallic silver |

What is claimed is:

1. A display for presenting selected images to a viewer comprising:

a substrate;

a photosensitive layer provided over the substrate which is adapted to be exposed and developed to provide viewable and conductive images;

a light modulating layer formed over the photosensitive layer and effective in two conditions, in a first condition to prevent the viewing of the viewable and conductive images and in a second condition to permit viewing of the viewable and conductive images; and electrical conduction means connected to the viewable and conductive images for applying a field to selected ones of such viewable and conductive images to cause the light modulating layer overlying the selected ones of the viewable and conductive images to change from the first condition to the second condition so as to present such viewable and conductive images for viewing to the viewer.

2. The display of claim 1 wherein the photosensitive layer includes silver halide and the viewable and conductive images are formed of developed silver.

3. The display of claim 1 wherein the electrical conduction means includes a plurality of conductive pins which contact the viewable and conductive images to permit an electrical potential to be applied across a selected viewable and conductive image.

4. A display for presenting selected images to a viewer comprising:

a substrate;

a photosensitive layer provided over the substrate which is adapted to be exposed and developed to provide viewable and conductive images;

a light modulating layer formed over the photosensitive layer and effective in two conditions, in a first condition to prevent the viewing of the viewable and conductive images and in a second condition to permit viewing of the viewable and conductive images;

a transparent substrate;

a transparent electrically conducting layer formed between the transparent substrate and the light modulating layer; and electrical conduction means connected to the viewable and conductive images and the transparent electrically conducting layer for applying a field to selected ones of such viewable and conductive images to cause the light modulating layer overlying the selected ones of the viewable and conductive images to change from the first condition to the second condition so as to present such images for viewing to the viewer.

5. The display of claim 4 wherein the photosensitive layer includes silver halide and the viewable and conductive images are formed of developed silver.

6. The display of claim 4 wherein the electrical conduction means includes a plurality of conductive pins which contact the viewable and conductive images to permit an electrical potential to be applied across a selected image and the transparent electrically conducting layer.

7. A display for presenting selected images to a viewer comprising:

a substrate;

a photosensitive layer provided over the substrate which is adapted to be exposed and developed to provide viewable and conductive images;

a light modulating layer including liquid crystal material in a gelatin matrix and provided over the photosensitive layer and effective in two conditions, in a first condition to prevent the viewing of the viewable and conductive images and in a second condition to permit viewing of the viewable and conductive images;

a transparent substrate;

a transparent electrically conducting layer formed between the transparent substrate and the light modulating layer; and electrical conduction means connected to the viewable and conductive images and the transparent electrically conducting layer for applying a field to selected ones of such viewable and conductive images to cause the light modulating layer overlying the selected ones of the viewable and conductive images to change from the first condition to the second condition so as to present such viewable and conductive images for viewing to the viewer.

8. The display of claim 7 wherein the photosensitive layer includes silver halide and the viewable and conductive images are formed of developed silver.

9. The display of claim 7 wherein the electrical conduction means includes a plurality of conductive pins which contact the viewable and conductive images to permit an electrical potential to be applied across a selected image and the transparent electrically conducting layer.

10. A method of forming a display in which images can be selectively presented to a viewer, comprising the steps of:

(a) providing a substrate;

(b) forming a photosensitive layer including silver halide over the substrate, and exposing and developing such photosensitive layer to provide viewable and conductive images;

(c) forming a light modulating layer including liquid crystal material in a gelatin over the photosensitive layer, such light modulating layer being effective in a first condition to prevent the viewing of the viewable and conductive images and in a second condition to permit the viewing of the viewable and conductive images; and (d) providing electrical connection so that an electrical field can be applied to selected ones of the viewable and conductive images to cause the light modulating layer overlying the selected ones of the viewable and conductive images to change from the first condition to the second condition so as to present such viewable and conductive images for viewing to the viewer.

* * * * *